United States Patent Office 3,560,528
Patented Feb. 2, 1971

3,560,528
6a,10a-TRANS-6a,7,10,10a-TETRAHYDRODIBENZO
(b,d)-PYRAN PRODUCTION
Theodor Petrzilka, 6 Rigistrasse, Erlenbach, Switzerland
No Drawing. Filed May 8, 1968, Ser. No. 727,711
Claims priority, application Switzerland, May 19, 1967,
7,081/67
Int. Cl. C07d 7/20
U.S. Cl. 260—345.3        8 Claims

ABSTRACT OF THE DISCLOSURE

This invention is directed to a process of producing 1-hydroxy - 3 - n-amyl-6,6,9-trimethyl-6a,10a-trans-6a,7,10,10a - tetrahydrodibenzo(b,d) - pyran and related pyrans from resorcinols, which pyrans possess psychotomimetic and analgesic activity.

BACKGROUND OF THE INVENTION

The crude resin obtained from the flowering tops of female plants of several Cannabis sativa L. varieties has been known and used as a psychotomimetic agent for many years. The structure of this material known variously as marihuana, hashish, etc. had evaded elucidation for many years. Advanced techniques in the field of the molecular structural identification such as NMR have led to the identification of the active ingredients of the various Cannabis sativa L. Hively et al. in J. Am. Chem. Soc. 88, 1832 (1966) identified the psychotomimetically active component extracted from varieties of Mexican hemp as

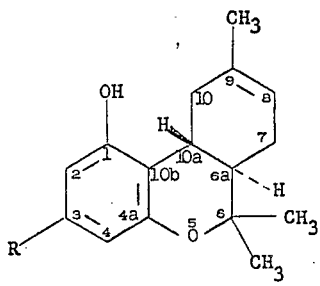

I-A wherein R is n-amyl.

Sinnce the source of hashish or marihuana has been from the extraction of this material from various species of plants, it has long been desired to provide an economical means of chemically synthesizing this material, thereby eliminating the necessity of isolating this material from its natural source.

SUMMARY OF THE INVENTION

In accordance with this invention, it has been discovered that compounds of the formula

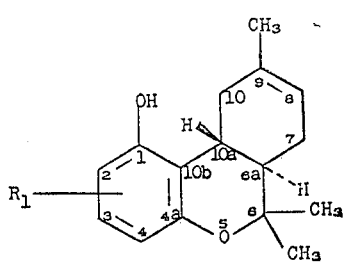

I wherein R₁ is hydrogen or alkyl containing from 1 to 10 carbon atoms can be easily synthesized by condensing in the presence of an acid agent a resorcinol of the general formula

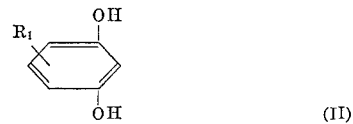

(II)

wherein R₁ is as above with either 1,5,8-menthatriene which has the formula

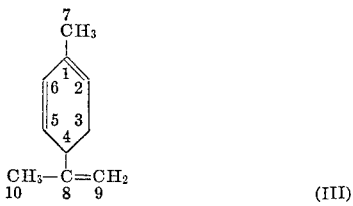

(III)

or with (+) p-menthadien (2,8)-ol-(1) which has the general formula

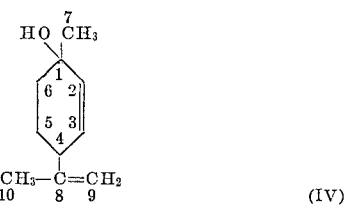

(IV)

In addition to producing the naturally occurring products of Formula I–A above, which has known bactericidal, sedative, analgesic and psychotomimetic properties, the process of this invention can produce new and novel pyrans of the formula

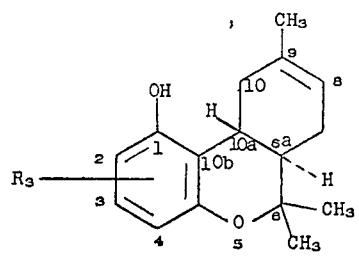

I-B wherein R₃ is hydrogen or alkyl containing from 1 to 10 carbon atoms with the proviso that when R₃ is n-pentyl R₃ is not substituted in the 3-position.

The novel compounds of Formula I-B exhibit psychotomimetic, analgesic, sedative, and bactericidal properties in like manner as the naturally occurring compound of Formula I-A above.

DETAILED DESCRIPTION

The numbering of the rings in compounds of the Formulae I, I-A, I-B, III and IV is shown for the purpose of convenience. As used throughout the application, the term alkyl comprehends both straight and branched chain alkyl groups containing from 1 to 10 carbon atoms such as methyl, ethyl, n-propyl, isopropyl, n-butyl, tert-butyl, n-heptyl, n-octyl, etc. In accordance with a preferred embodiment of this invention, R is an alkyl residue situated in the 5-position of the compound of Formula II above.

The compounds of Formula I above, are useful as psychotomimetic agents, sedatives and analgesics. The compounds of Formula I above are used in the form of conventional pharmaceutical preparations which contain said compounds in connection with conventional pharmaceutical organic or inorganic carrier materials suitable for internal administration. The pharmaceutical compositions containing the compounds of Formula I above can be administered parenterally or orally, dosages can be adjusted to individual requirements, for example these compounds can be administered in dosages of from about 0.1 mg./kg. to about 5 mg./kg. per day. These dosages can be administered in single dosage form or in divided dosage forms. The pharmaceutical compositions can contain such conventional organic or inorganic inert carrier materials such as water, gelatin, lactose, starch, magnesium stearate, talc, vegetable oils, gums, polyalkylene glycose, Vaseline or the like. The pharmaceutical preparations can be in the conventional solid forms such as tablets, dragees, suppositories, capsules or in conventional liquid form such as solutions, suspensions or emulsions. The pharmaceutical compositions can be submitted to conventional pharmaceutical expedients such as sterilization and/or can contain conventional pharmaceutical additives such as preservatives, stabilizing agents, wetting agents, emulsifying agents, salts for adjusting the osmotic pressure, buffers or the like. They can also contain other therapeutically useful materials.

As examples of the compounds of Formula II above that can be utilized in the process of this invention are included resorcinol, 5-ethyl resorcinol, 2-(3,5-dihydroxyphenyl)hexane, 2-(3,5-dihydroxyphenyl)-3-methyl octane, 5-n-propyl resorcinol, 5-methyl resorcinol (orcinol), 5-n-pentyl resorcinol (olivetol), 5-(1-methylbutyl)-resorcinol, 5-n-hexylresorcinol, 5 - (1-ethylbutyl)resorcinol, 5 - (1-methylpentyl)resorcinol, 5-(1,1-dimethylbutyl)resorcinol, 5-(1,2-dimethylbutyl)resorcinol, 5-n-heptylresorcinol, 5-(1-methylhexyl)resorcinol, 5-n-octylresorcinol, 5 - (1-n-propylpentyl)-resorcinol, 5-(1,2-dimethylheptyl)resorcinol, 5-(1-methyloctyl)resorcinol, and the like.

Any of the isomers of (+)-p-menthadienol-(1) of Formula IV above which are (+)-cis and (+)-trans-p-menthadienol-(1) as well as the racemic mixture thereof can be utilized in the process of this invention to produce the compound of Formula I above.

The condensation reaction of this invention can be carried out in a conventional inert solvent. Among the preferred solvents are included aliphatic or aromatic hydrocarbons such as petroleum ether, benzene, toluene, etc.; halogenated aliphatic or aromatic hydrocarbons such as methylene chloride, chloroform, carbon tetrachloride, chlorobenzene, etc.; nitrated hydrocarbons such as nitrobenzene, etc.; and ethers such as diethyl ether, tetrahydrofuran, dioxan, etc. Among the other conventional solvents which are preferred to be utilized in the process of this invention are included dimethylformamide, dimethylsulphoxide, liquid sulphur dioxide.

The reaction of this invention to produce the compound of Formula I above is carried out in the presence of any conventional organic or inorganic acid agents. Among the preferred acid agents which can be utilized in carrying out the process of this invention are included Lewis acids such as boron trifluoride, zinc chloride, aluminum chloride, tin tetrachloride, etc.; mineral acids such as hydrochloric acid, hydrobromic acid, hydrofluoric acid, sulfuric acid, phosphoric acid, polyphosphoric acids, etc.; and organic acids such as p-toluene sulphonic acid, methane sulphonic acid, formic acid, glacial acetic acid, trifluoroacetic acid, trichloroacetic acid, oxalic acid, maleic acid etc. Sulphur dioxide can be utilized as both the acid medium and the organic solvent. Therefore, when liquid sulphur dioxide is utilized as the solvent medium, the reaction of this invention will take place without the addition of any other acid agent.

In carrying out the condensation reaction of this invention, the two reactants may be present in any mole ratio. Generally, in carrying out the reaction of this invention, it is preferred to utilize the compound of Formula II above and either the compound of Formula III above or the compound of Formula IV above in equimolar amounts or with a slight excess of either the compound of Formula III above or the compound of Formula IV above.

In carrying out this condensation reaction to produce the compound of Formula I above, temperature and pressure are not critical and this reaction can be carried out at room temperature and atmospheric pressure. If desired, lower or elevated temperatures can be utilized. This condensation reaction is advantageously effected at a temperature of from about 0° C. to about 120° C. In a preferred embodiment of this invention, the reaction is particularly preferably carried out in the presence of p-toluene-sulphonic acid in benzene by heating to a temperature of about 80° C. for 2 hours under reflux conditions.

The process of this invention provides a simple and economic means of converting resorcinols into sterically defined compounds of Formula I above.

The following examples serve to illustrate the invention but are not limitative thereof. All temperatures are in degrees centigrade.

EXAMPLE 1

A solution of 360 mg. of olivetol and 270 mg. of (±)-p-menthatriene-(1,5,8) in 7 ml. of liquid sulphur dioxide is allowed to stand at room temperature for 24 hours fused in a bomb-tube. The sulphur dioxide is thereupon evaporated off under a calcium chloride tube. The oily residue is dissolved in diethyl ether. The ether solution is extracted once with dilute sodium hydrogen carbonate and dried over sodium sulphate. After evaporation of the ether, 633 mg. of a yellow resin remains. The yellow resin which is obtained is chromatographed on 20 g. of silica gel and upon elution with benzene and distillation at high vacuum, 168 mg. of (±)-1-hydrovy-3n-amyl-6,6,9-trimethyl-6a,10a-trans-6a,7,10,10a - tetrahydrodibenzo(b,d)-pyran is obtained. The $R_F$ value of the tetrahydrodibenzopyran obtained is 0.46; boiling point 140–150°/0.001 mm. Hg.

EXAMPLE 2

A mixture of 450 mg. of olivetol, 380 mg. (+)-cis-p-menthadien-(2,8)-ol-(1) and 58 mg. of p-toluenesulphonic acid monohydrate in 25 ml. of benzene is boiled under reflux for 2 hours. The resulting orange-yellow solution is cooled in an ice-water bath and dissolved in diethyl ether. The ether solution is immediately shaken once with dilute sodium hydrogen carbonate solution and once with sodium chloride solution. The almost completely decolorized ether solution is dried over sodium sulphate. After evaporation of the ether, 818 mg. of a light-yellow oil remained. The resulting yellow oil is chromatographed on 35 g. of silica gel and upon elution with benzene and distillation at high vacuum, 384 mg. of (−)-1-hydroxy-3n-amyl-6,6,9-trimethyl-6a,10a-trans-6a,7,10,10a-tetrahydrodibenzo(b,d)-pyran is obtained.

EXAMPLE 3

A mixture of 474 mg. of olivetol, 403 mg. of (+)-trans-p-menthadien-(2,8)-ol(1) and 80 mg. of p-toluenesulphonic acid monohydrate in 25 ml. of benzene is reacted in the manner of Example 2. There resulted 900 mg. of a yellow oil. The resulting yellow oil was chromatographed with 35 g. of silica gel and upon elution with benzene and distillation at high vacuum, 436 mg. of (−)-1-hydroxy-3n-amyl-6,6,9-trimethyl-6a,10a-trans - 6a,7,10,10a-tetrahydrodibenzo(b,d)-pyran was obtained having an $R_F$ value (silica gel thin layer chromatogram in chloroform) of 0.51; and a boiling point of 140–150° C./0.001 mm. Hg.

EXAMPLE 4

A mixture of 2.6 g. (13.4 mmol) of 2-(3,5-dihydroxyphenyl)hexane, 2.05 g. (13.4 mmol) of (+)-trans-p-menthadien-(2,8)-ol-(1) and 260 mg. (1.35 mmol) of p-toluenesulphonic acid monohydrate in 60 ml. of benzene is boiled under reflux for 2½ hours. The resulting orange solution is cooled in an ice-water bath and dissolved in diethyl ether. The ether solution is immediately shaken once with a dilute sodium hydrogen carbonate solution and once with a sodium chloride solution. The now almost completely colorless ether solution is dried over sodium sulphate. After evaporation of the ether there remains 4.85 g. of a light yellow oil. The resulting oil is chromatographed on 130 g. of silica gel and upon elution with a 1 to 1 by volume mixture of hexane and benzene and drying to constant weight, there is obtained (—)-1-hydroxy-3-[hexyl(2)] - 6,6,9 - trimethyl - 6a,10a-trans-6a,7,10,10a-tetrahydrodibenzo(b,d) - pyran. After distillation under high vacuum the product has an $R_F$ value (silica gel chromatogram in chloroform) of 0.58 and a boiling point of 190° C./0.001 mm. Hg.

EXAMPLE 5

A mixture of 2.16 g. (9.15 mmol) of 2-(3,5-dihydroxyphenyl)-3-methyl octane, 1.4 g. (9.2 mmol) of (+)-trans-p-menthadien-(2,8)-ol-(1) and 175 mg. (0.92 mmol) of p-toluene sulphonic acid monohydrate in 60 ml. of benzene is heated under reflux for 2¼ hours. The resulting solution is cooled with an ice-water bath and dissolved in diethyl ether. The ether solution is immediately shaken once with a dilute sodium hydrogen carbonate solution and once with a sodium chloride solution. The solution is then dried over sodium sulphate and after evaporation of the ether there remains 3.4 g. of a light yellow oil. The resulting yellow oil is chromatographed on 70 g. of silica gel and upon elution with 1 to 1 by volume mixture of hexane and benzene and drying to constant weight, (—)-1-hydroxy-3-[3-methyloctyl(2)]-6,6,9-trimethyl - 6a,10a-trans-6a,7,10,10a-tetrahydrodibenzo(b,d)-pyran is produced. Upon distillation under high vacuum, this product has an $R_F$ value (silica gel chromatogram in chloroform) of 0.55 and a boiling point of 190° C./0.001 mm. Hg.

EXAMPLE 6

A 2.84 g. (20 mmol) of orcinol-monohydrate is mixed with 3.05 g. (20 mmol) of (+)-trans-p-menthadien-(2,8)-ol-(1) in 50 ml. of benzene and 0.39 g. (2 mmol) of p-toluene sulphonic acid monohydrate. This mixture is heated at reflux for 2 hours. The resulting reaction solution is added to 50 ml. of diethyl ether and extracted once with a dilute sodium bicarbonate solution. The ether phase is dried over sodium sulphate to evaporate the ether. There results 5.6 g. of a yellow oil which is chromatographed with 180 g. of silica gel and eluted with benzene. The eluted solution is distilled at high vacuum yielding 2350 mg. of (—)-1-hydroxy-3,6,6,9-tetramethyl-6a,10a-trans-6a,7,10,10a-tetrahydrodibenzo(b,d)-pyran. This compound has an $R_F$ value of 0.48 and a boiling point of 130–140° C./0.001 mm. Hg.

EXAMPLE 7

A solution of 0.427 g. (2.37 mmol) of olivetol and 0.356 g. (2.34 mmol) of (+)-trans-p-menthadien-(2,8)-ol-(1) in liquid sulphur dioxide is allowed to stand at room temperature for 70 hours fused in a bomb-tube. Thereafter, the solvent medium is carefully distilled off. The residue is dissolved in 50 ml. of diethyl ether. The ether solution is extracted once with a dilute sodium bicarbonate solution. After extraction, the ether solution is dried. The dry residue (0.74 g.), which is obtained is chromatographed on silica gel and eluted with chloroform. One obtains after distillation utilizing a high vacuum, 142 mg. of (—)-1-hydroxy-3-n-amyl-6,6,9-trimethyl-6a,10a-trans-6a,7,10,10a-tetrahydrodibenzo(b,d)-pyran. This compound has an $R_F$ value (silica gel thin layer chromatogram in chloroform) of 0.51 and a boiling point of 140–150° C./0.001 mm. Hg.

EXAMPLE 8

0.595 g. (3.3 mmol) olivetol is mixed with 0.502 g. (3.3 mmol) (+)-cis-p-menthadien-(2,8)-ol-(1) in 8 ml. of liquid sulphur dioxide. This mixture is allowed to stand at room temperature for 120 hours fused in a bomb-tube. After working up the mixture in the manner described in Example 1, 1.085 g. of an oily residue is obtained. The oil is chromatographed over silica gel and eluded with chloroform. Upon distillation of the chloroform, 215 mg. of (—)-1-hydroxy-3-n-amyl-6,6,9-trimethyl - 6a,10a - trans - 6a,7,10,10a-tetrahydrodibenzo(b,d)-pyran is obtained. This compound has an $R_F$ value (silica gel thin layer chromatogram in chloroform) of 0.52 and a boiling point of 140–150° C./0.001 mm. Hg.

EXAMPLE 9

A mixture of 0.54 g. (3 mmol) of olivetol, 0.46 g. (3 mMol) of (+)-trans-p-menthadien-(2,8)-ol-(1) and 0.5 ml. of trifluoro acetic acid in 50 ml. of benzene is refluxed for 5 hours. The resulting solution is worked up in the manner of Example 2 to yield 0.95 g. of a residue. The resulting residue is chromatographed on silica gel and upon elution with chloroform and distillation at high vacuum yields 520 mg. of (—)-1-hydroxy-n-amyl - 6,6,9-trimethyl-6a,10a-trans-6a,7,10,10a-tetrahydrodibenzo(b,d)-pyan. This compound has an $R_F$ value (silica gel thin layer chromatogram in chloroform) of 0.52 and a boiling point of 140–150° C./0.001 mm. Hg.

EXAMPLE 10

A mixture of 2.2 g. of (20 mmol) of crystalline resorcinol, 3.05 g. (20 mmol) (+)-trans-p-menthadien-(2,8)-ol-(1) and 0.4 g. (2 mmol) of p-toluene sulphonic acid monohydrate in 50 ml. of benzene is heated under reflux for 2 hours. The resulting solution is dissolved in 50 ml. of diethyl ether. The ether is extracted once with dilute sodium bicarbonate solution. The ether phase is dried and evaporated. 5.1 g. of a yellow oil is obtained. This oil is chromatographed on 250 g. of silica gel and eluded with benzene. After distilling off the benzene under high vacuum, there is obtained 778 mg. of (—)-1-hydroxy - 6,6,9 - trimethyl-6a,10a-trans-6a,7,10,10a-tetrahydrodibenzo(b,d)-pyran. This compound has an $R_F$ value (silica gel thin layer chromatogram in chloroform) of 0.35 and a boiling point of 155° C./0.001 mm. Hg.

What is claimed is:
1. A process for preparing a compound of the formula

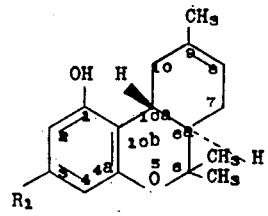

wherein $R_1$ is hydrogen or alkyl containing from 1 to 10 carbon atoms comprising condensing a resorcinol of the formula

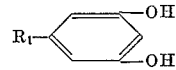

wherein $R_1$ is as above; with a material selected from the group consisting of 1,5,8-methatriene and (+) p-methadien-(2,8)-ol-(1) in the presence of an acid.

2. The process of claim 1, wherein said material is 1,5,8-menthatriene.

3. The process of claim 2, wherein said resorcinol is olivetol.

4. The process of claim 1, wherein said material is (+)-cis-menthadien-(2,8)-ol-(1).

5. The process of claim 4, wherein said resorcinol is olivetol.

6. The process of claim 1, wherein said material is (+)-trans-p-menthadien-(2,8)-ol-(1).

7. The process of claim 6, wherein said resorcinol is olivetol

8. The process of claim 1, wherein said acid is sulfonic p-toluene sulphonic acid and said condensation reaction is carried out in benzene at the reflux temperature.

References Cited

UNITED STATES PATENTS

| | | | |
|---|---|---|---|
| 2,419,934 | 5/1947 | Adams | 260—345.3 |
| 2,419,935 | 5/1947 | Adams | 260—345.3 |
| 2,419,936 | 5/1947 | Adams | 260—345.3 |
| 2,419,937 | 5/1947 | Adams | 260—345.3 |
| 3,388,136 | 6/1968 | Taylor et al. | 260—345.3 |

OTHER REFERENCES

Hively et al., J. Am. Chem. Soc., vol. 88, pp. 1832–3 (1966).

Petrzilka et al., Helv. Chim. Acta, vol. 50, pp. 1416–9 (1967).

JOHN M. FORD, Primary Examiner

U.S. Cl. X.R.

260—999

PO-1050
(5/69)

UNITED STATES PATENT OFFICE
CERTIFICATE OF CORRECTION

Patent No. 3,560,528          Dated February 2, 1971

Inventor(s) Theodor Petrzilka

It is certified that error appears in the above-identified patent and that said Letters Patent are hereby corrected as shown below:

Column 6, line 62, claim 1    "methatriene"

should be    --menthatriene--

Column 6, line 63, claim 1    "methadien"

should be    --menthadien--

Column 6, line 69, claim 4 "(+)-cis-menthadien"

should be    --(+)-cis-p-menthadien--

Signed and sealed this 13th day of July 1971.

(SEAL)
Attest:

EDWARD M. FLETCHER, JR.
Attesting Officer

WILLIAM E. SCHUYLER, J
Commissioner of Patent